(12) United States Patent
Otake et al.

(10) Patent No.: US 10,001,364 B2
(45) Date of Patent: Jun. 19, 2018

(54) HOLDING MECHANISM

(71) Applicant: MITUTOYO CORPORATION, Kanagawa (JP)

(72) Inventors: Tomoyuki Otake, Kanagawa (JP); Yasuo Yamaguchi, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days. days.

(21) Appl. No.: 15/603,926

(22) Filed: May 24, 2017

(65) Prior Publication Data

US 2017/0356737 A1 Dec. 14, 2017

(30) Foreign Application Priority Data

Jun. 9, 2016 (JP) .................................. 2016-115755

(51) Int. Cl.
*G01B 11/02* (2006.01)
(52) U.S. Cl.
CPC .................... *G01B 11/02* (2013.01)
(58) Field of Classification Search
CPC .................................................. G01B 11/02
USPC ....................................................... 356/634
See application file for complete search history.

(56) References Cited

U.S. PATENT DOCUMENTS

| 4,512,010 A | * | 4/1985 | Yamada | G11B 3/38 |
|---|---|---|---|---|
| | | | | 369/220 |
| 2005/0087022 A1 | * | 4/2005 | Yokono | G01N 3/08 |
| | | | | 73/818 |
| 2017/0097221 A1 | * | 4/2017 | Hidaka | G01B 5/204 |

FOREIGN PATENT DOCUMENTS

JP 4956263 B2 6/2012

* cited by examiner

*Primary Examiner* — Roy M Punnoose
(74) *Attorney, Agent, or Firm* — Greenblum & Bernstein, P.L.C.

(57) ABSTRACT

A holding mechanism used in a measuring device includes a first groove, a second groove, and a pair of holding members holding the detection device by being attached to first and second sides in a length direction of a scale frame. The pair of holding member include a plate-like main body, a first hook portion engaging with the first groove, a second hook portion engaging with the second groove, and a projecting tab projecting from the main body and positioned at a gap. The pair of holding members are displaced from first and second sides toward the detection device along the length direction of the scale frame and the projecting tab is inserted into the gap, and thereby the projecting tab biases the scale frame and the detection device in mutually separating directions.

20 Claims, 18 Drawing Sheets

Fig. 3A
Fig. 3B
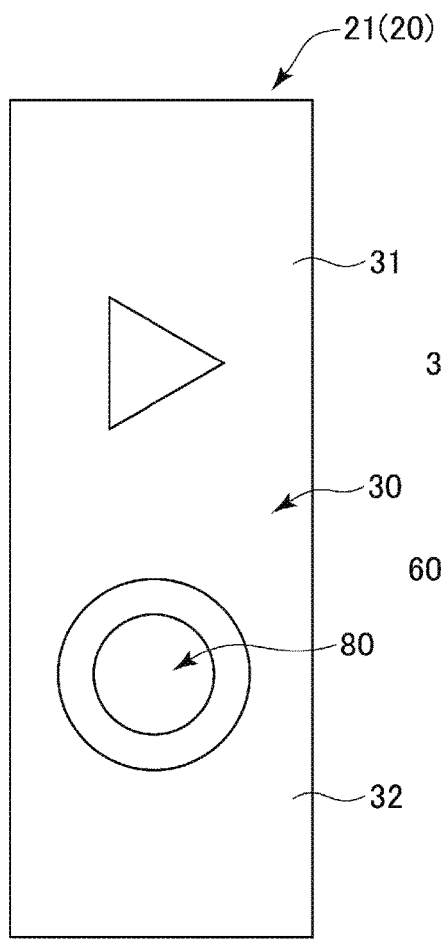
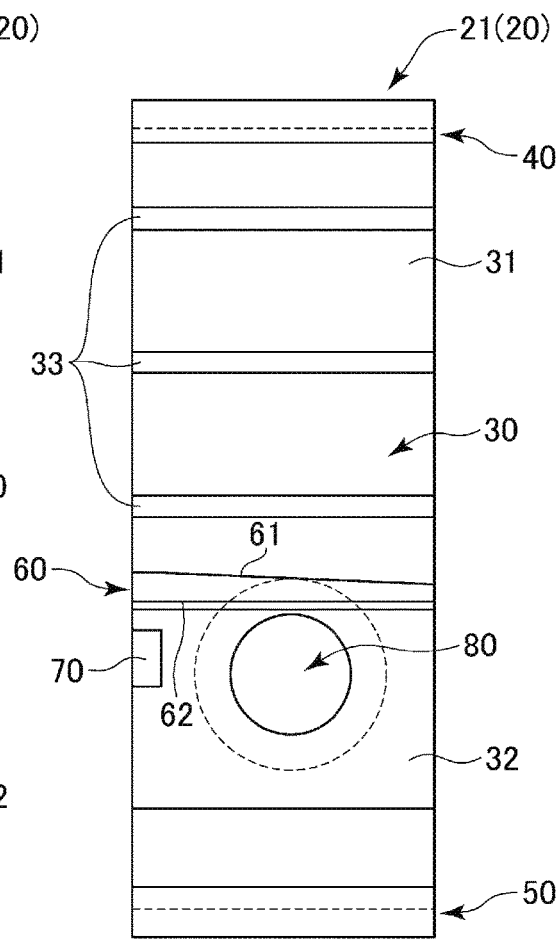
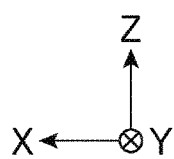
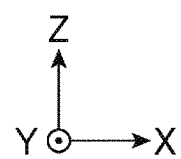

Fig. 4A
Fig 4B
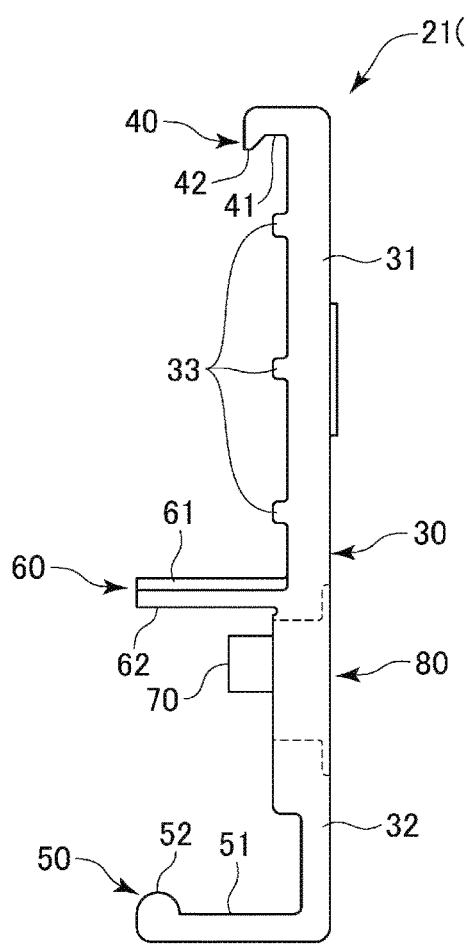
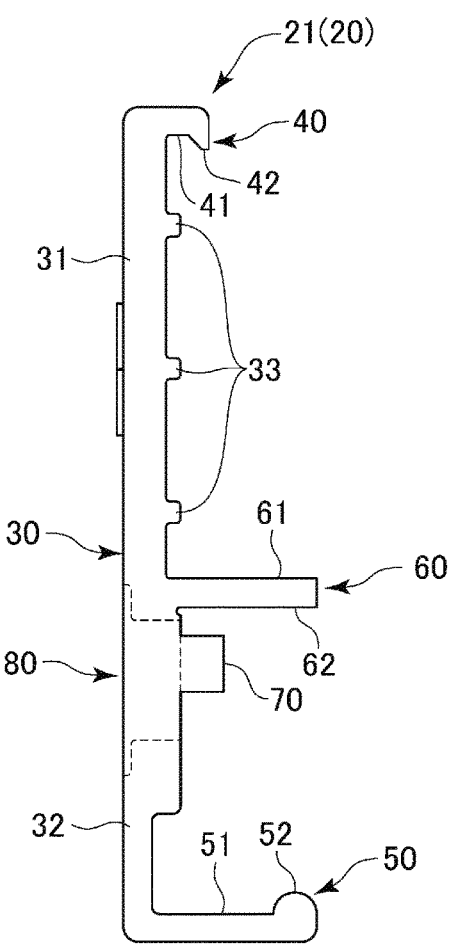

Fig. 7A
Fig. 7B
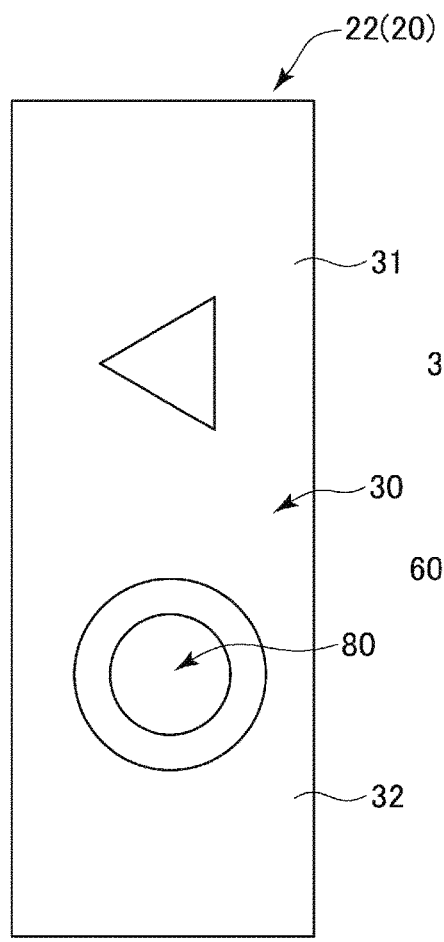
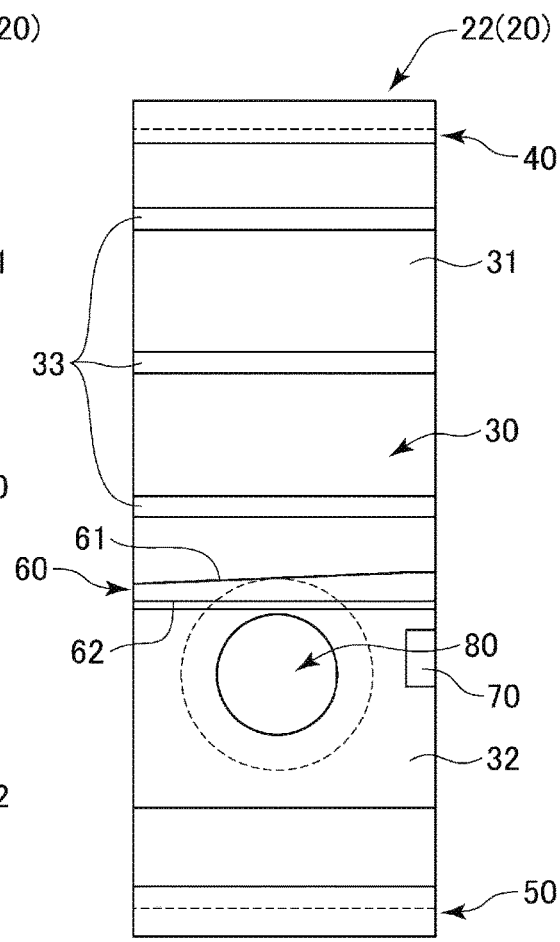
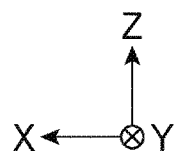
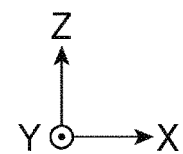

Fig. 8A
Fig. 8B
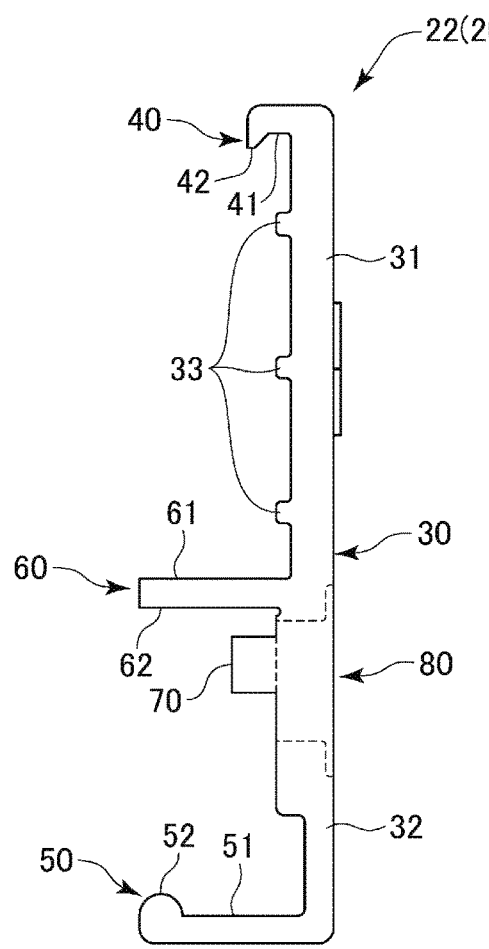
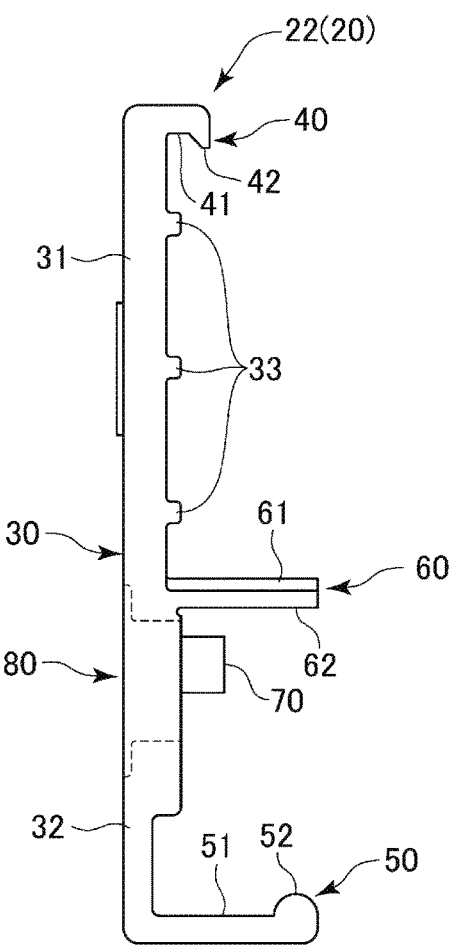
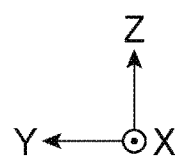
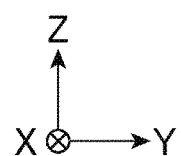

HOLDING MECHANISM

CROSS-REFERENCE TO RELATED APPLICATIONS

The present application claims priority under 35 U.S.C. § 119 of Japanese Application No. 2016-115755, filed on Jun. 9, 2016, the disclosure of which is expressly incorporated by reference herein in its entirety.

BACKGROUND OF THE INVENTION

1. Field of the Invention

With a measuring device that includes a long scale frame housing a scale and a detection device detecting an amount of relative displacement with respect to the scale, the present invention relates to a holding mechanism holding the detection device to the scale frame.

2. Description of Related Art

Conventionally, a measuring device (linear scale) is known which includes a long scale frame housing a scale and a detection device detecting an amount of relative displacement with respect to the scale, the measuring device measuring an amount of displacement between a pair of measurable (measured) portions in a machine tool or the like. In such a measuring device, a measuring device main body is fixated to one of the pair of measured portions, the detection device is fixated to the other of the pair, and the detection device reads an amount of relative displacement with respect to the scale inside the scale frame, and thereby the measuring device measures the amount of displacement between the measured portions.

In a measuring device having the detection device displaceably provided to the measuring device main body, when the detection device moves in an arbitrary direction relative to the measuring device main body during a transport step prior to attachment to the measured portions, for example, there is a possibility that the scale and a sensor of the detection device may collide and be damaged. In order to prevent such damage, a holding tool is used which holds the detection device to the measuring device main body and constrains displacement. The holding tool is also used in positioning the detection device relative to the measuring device main body when attaching the measuring device to the measured portions.

A typical example of a holding tool holding the detection device includes a pair of holding members engaged on both side surfaces in a displacement direction of the detection device, and the holding members are fixated by screwing to the scale frame. However, because the holding members are screwed into place, a task of attaching and detaching the holding members may become complicated. Moreover, in order to screw the holding members into place, a screw hole must be formed in the scale frame by tapping, and the effort and cost involved to do so may increase. In addition, because a fixation location of the holding members (i.e., a holding position of the detection device) is limited by the screw hole, there is no freedom in positioning the detection device when attaching the detection device to the measured portions, and ease of an attachment task may decrease.

In order to resolve the above-noted inconveniences with conventional holding tools, a holding device is proposed by the present applicants which includes a holding main body abutting a side surface of a detection device; a holder extending from the holding main body and engaging with a groove of a scale frame; and a holding displacer displacing the holder and engaging with the groove (see Japanese Patent No. 4956263). According to the holding device recited in Japanese Patent No. 4956263, by displacing the holder in a width direction of the groove using the holding displacer and engaging the holder with the groove due to such displacement, a detection device can be positioned at any desired position in a length direction of the scale frame and ease of a task of attaching the measuring device to a measured portion can be improved.

However, in the conventional holding device, the holding displacer is configured by combining a plurality of various members such as threaded members, pressing members, biasing members, and the like, and therefore a structure of the holding device may become complicated. Also, because the holding member is engaged by rotating a threaded member from below the measuring device, tasks of fixating and releasing the holding member become complex, and ease of the task of attaching the measuring device cannot always be adequately achieved.

SUMMARY OF THE INVENTION

The present invention provides a holding mechanism capable of readily attaching and detaching using a simple structure, and capable of adequately improving ease of a task of attaching a measuring device.

A holding mechanism according to the present invention is used in a measuring device that includes a long scale frame fixated to a first measured portion and housing a scale; and a detection device fixated to a second measured portion and provided so as to be capable of displacement in a length direction of the scale frame, the detection device detecting an amount of relative displacement relative to the scale. The holding mechanism includes a first groove formed in the scale frame along the length direction of the scale frame; a second groove formed in the detection device so as to be parallel to the first groove; and a pair of holding members holding the detection device by being attached to first and second sides in the length direction of the scale frame. The pair of holding member include a plate-like main body attached along a side surface of the scale frame and the detection device; a first hook portion projecting from the main body and engaging with the first groove; a second hook portion projecting from the main body and engaging with the second groove; and a projecting tab projecting from the main body and positioned at a gap between the scale frame and the detection device. The pair of holding members are displaced from the first and second sides toward the detection device along the length direction of the scale frame and the projecting tab is inserted into a gap between the scale frame and the detection device, and thereby the projecting tab biases the scale frame and the detection device in mutually separating directions.

According to this invention, the pair of holding members include the first hook portion engaging with the first groove; the second hook portion engaging with the second groove; and the projecting tab biasing the scale frame and the detection device in mutually separating directions by inserting the projecting tab into the gap between the scale frame and the detection device, and the pair of holding members displace from the first and second sides along the length direction of the scale frame toward the detection device, enabling the pair of holding members to be mounted on the measuring device. Accordingly, the pair of holding members can be mounted without performing work from below the measuring device, and therefore ease of an attachment task can be improved.

Also, the pair of holding members engage the first hook portion on the first groove and engage the second hook portion on the second groove, and also displace the respective projecting tabs toward the detection device along the length direction of the scale frame and insert the respective projecting tabs into the gap, enabling the detection device to be held from two sides. At this point, the projecting tab makes sliding contact with the scale frame and the detection device, and the detection device and scale frame are biased in mutually separating directions, enabling contact between the scale frame and the detection device to be prevented. Accordingly, the pair of holding members can prevent the scale or a sensor of the detection device from being damaged by contact which may occur between the scale frame and the detection device due to shaking or the like during transport.

The pair of holding members are configured by the first hook portion, the second hook portion, and the projecting tab, which each have a simple shape. Therefore, the structure of the pair of holding members can be simplified. Displacement of the pair of holding members is regulated by friction between the first groove and the first hook portion; friction between the second groove and the second hook portion; and friction between the scale frame and detection device and the projecting tab. Therefore, when positioning the detection device, the detection device can be displaced along the length direction of the scale frame by applying a force that exceeds the friction. Accordingly, by using the pair of holding members, an operator can readily position the detection device.

The projecting tab is preferably formed such that a thickness of the projecting tab inserted into the gap between the scale frame and the detection device becomes progressively thicker farther away from the detection device.

According to such a configuration, the projecting tab of the pair of holding members is formed so as to become progressively thicker farther away from the detection device. Therefore, simply by displacing the pair of holding members from the first and second sides along the length direction of the scale frame toward the detection device, the scale frame and the detection device can be readily biased in mutually separating directions.

Preferably, the detection device is attached to the second measured portion by an attachment tool and includes an attachment hole with which the attachment tool engages. The pair of holding members preferably include an insertion hole formed on the main body and through which the attachment tool is inserted, and the pair of holding members are preferably fixated to the detection device by a locking tool inserted through the insertion hole and into the attachment hole.

According to such a configuration, by inserting the locking tool through the insertion hole and into the attachment hole, the detection device and the pair of holding members can be fixated to each other. Accordingly, the locking tool can prevent the pair of holding members from separating from the measuring device and can favorably maintain a retention status of the detection device. Moreover, the locking tool fixates the pair of holding members using the attachment hole, which is provided to the detection device. Accordingly, there is no need to provide a screw hole or the like simply to fixate the pair of holding members to the measuring device, and therefore costs can be reduced.

Preferably, the attachment tool includes an attachment shaft engaging with the second measured portion; and an attachment head having a diameter greater than that of the attachment shaft. The second measured portion preferably includes a fixation hole engaging with the attachment shaft. The locking tool preferably includes a locking shaft locking with the insertion hole and the attachment hole; and a locking head having a diameter greater than that of the insertion hole. Preferably, the insertion hole is formed to have a greater diameter than that of the attachment head, the attachment head is inserted through the insertion hole, and the insertion hole is formed to have a smaller diameter than that of the locking head.

According to such a configuration, the insertion hole is formed to have a diameter greater than that of the attachment head of the attachment tool and also to have a diameter smaller than that of the locking head of the locking tool, and the locking tool includes the locking head having the diameter greater than that of the insertion hole. Therefore, by removing the locking tool after determining an attachment position of the detection device, the operator can attach the detection device to the second measured portion using the attachment tool while the pair of holding members remain mounted. In other words, simply by swapping the locking tool for the attachment tool when moving from the task of positioning the detection device to the task of attaching the detection device, various tasks can be performed while the pair of holding members remain mounted and workability can be improved.

The attachment hole preferably includes a recess which is sunken into the detection device to accommodate the attachment head by engaging the fixation hole and the attachment shaft.

According to such a configuration, by providing the recess to the attachment hole, the attachment head can be sunk into and accommodated in a surface where the pair of holding members are attached, without the attachment head protruding. Therefore, after the detection device is attached to the second measured portion while the pair of holding members remain mounted, simply by displacing the holding members in the opposite direction from the direction in which the holding members were displaced when mounted on the measuring device, the holding members can be readily removed from the measuring device.

The pair of holding members preferably include a regulator on an end portion on an opposite side from the detection device, and the regulator preferably regulates displacement of the pair of holding members by abutting the side surface of the detection device.

According to such a configuration, the regulator abuts the detection device and regulates displacement of the pair of holding members, and therefore can prevent excessive displacement of the pair of holding members. In addition, the regulator enables accurate displacement of the pair of holding members to the predetermined holding position and also enables adequate retention of the detection device.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3A is a front view and FIG. 3B is a back view showing a first holding member of the pair of holding members;

FIG. 4A is a right side view and FIG. 4B is a left side view of the first holding member;

FIG. 7A is a front view and FIG. 7B is a back view showing a second holding member of the pair of holding members;

FIG. 8A is a right side view and FIG. 8B is a left side view of the second holding member;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figures 1A, 1B:
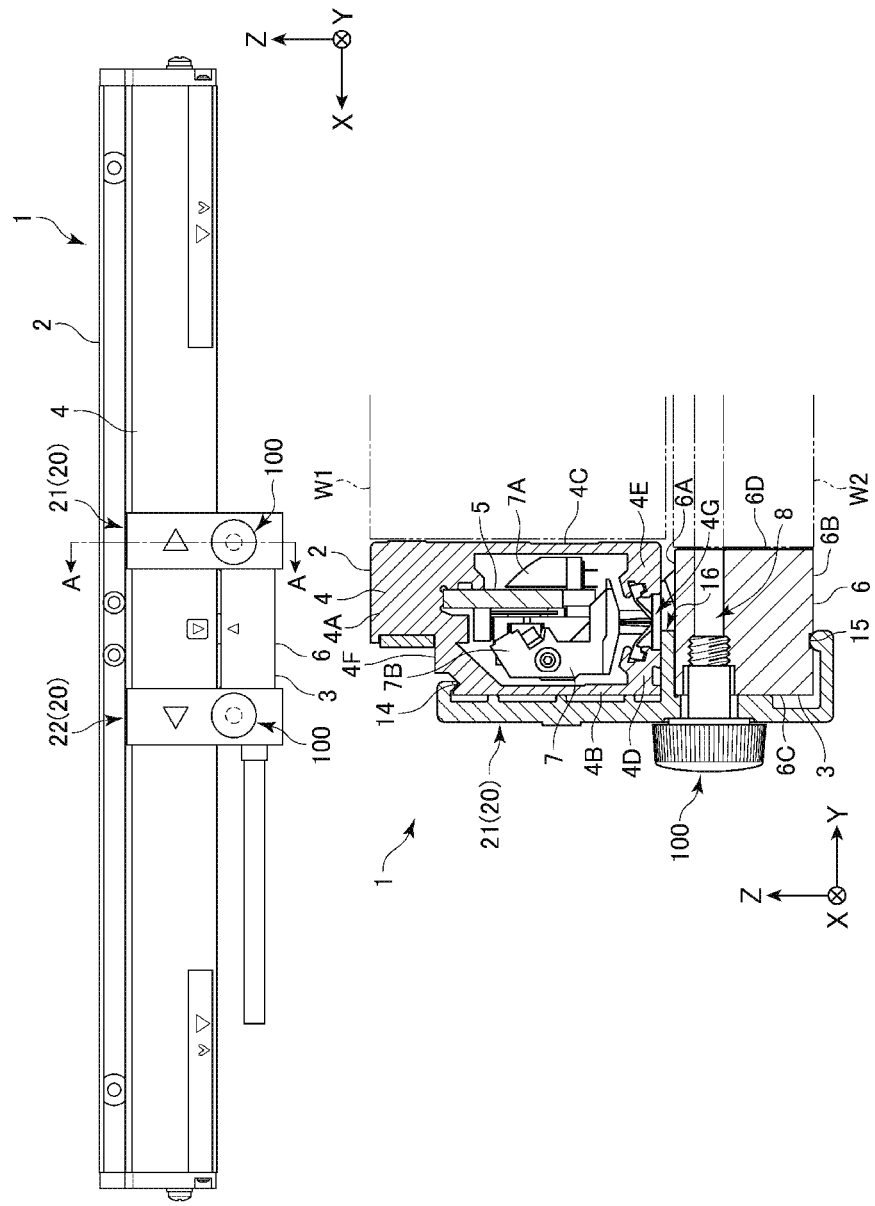
FIG. 1A is a front view and FIG. 1B is a cross-sectional view of a measuring device using a pair of holding members in a holding mechanism according to an embodiment of the present invention.
Figure 2:
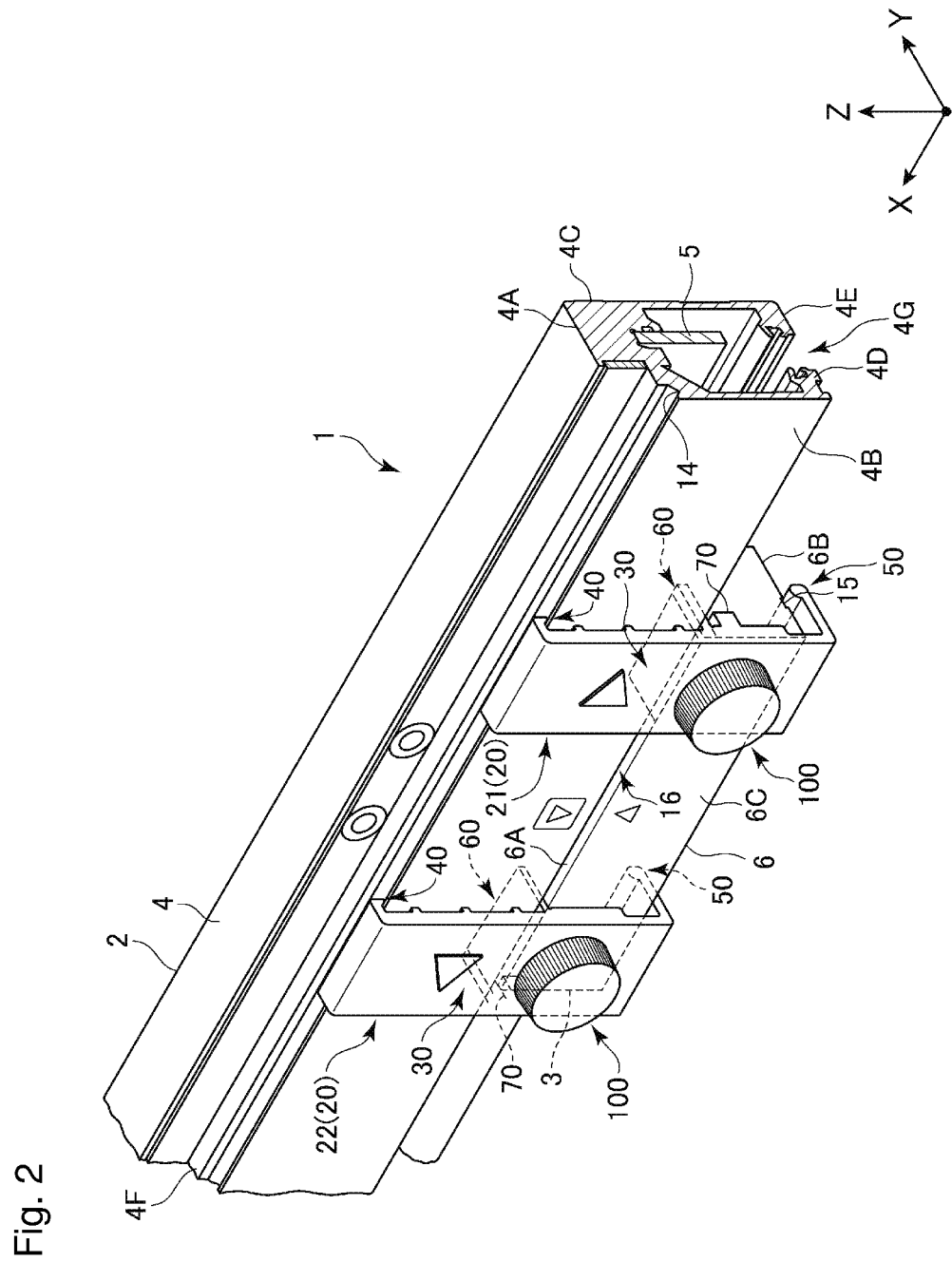
FIG. 2 is a perspective view of the measuring device using the pair of holding members.

Hereafter, an embodiment of the present invention is described with reference to the drawings. FIGS. 1A to 2 illustrate a measuring device (linear scale) using a pair of holding members in a holding mechanism according to an embodiment of the present invention. Specifically, FIG. 1A is a front view of a measuring device 1 using a pair of holding members (holders) 20, and FIG. 1B is a cross-sectional view along a cross-sectional plane A-A in FIG. 1A.

FIG. 2 is a perspective view of the measuring device 1 using the pair of holding members 20. As shown in FIGS. 1A to 2, the measuring device 1, which measures a displacement distance between measured portions, includes a measuring device main body 2 and a detection device (detector) 3, the detection device 3 being provided to the measuring device main body 2 so as to be capable of displacement. The measuring device 1 measures the displacement distance between a pair of measured (measurable) portions W1 and W2. The measuring device main body 2 is fixated to a first measured portion W1 and the detection device 3 is fixated to a second measured portion W2 (see FIG. 1B).

The measuring device main body 2 is configured to include an elongated scale frame 4 and a scale 5 stored within the scale frame 4. The scale frame 4 is formed so as to be hollow. The scale 5 includes a scale substrate composed of a translucent material such as glass; and scale marks formed on a surface of the scale substrate and composed of a diffraction grating having a fixed pitch. The scale 5 is fixated on an interior of the scale frame 4. In the following description and in each of the accompanying drawings, a length direction of the scale frame 4 and displacement direction of the detection device 3 is labeled an X direction, a width direction (inward direction) of the scale frame 4 orthogonal to the X direction is labeled a Y direction, and a vertical direction orthogonal to the X and Y directions is labeled a Z direction.

As shown in FIGS. 1A and 1B, the detection device 3 includes a detection device main body 6 provided to an exterior of the scale frame 4 and fixated to the second measured portion W2; and a detector 7 provided extending from the detection device main body 6 into the interior of the scale frame 4. The detector 7 is configured to include an optical emitter 7A provided along a first surface of the scale 5 and emitting light, and an optical receiver 7B provided along a second surface of the scale 5 and receiving transmitted light which has passed through the scale 5 from the optical emitter 7A. The detection device 3 generates an electric signal based on the transmitted light received by the optical receiver 7B, and when the detection device main body 6 receives the electric signal, the detection device 3 detects an amount of relative displacement from the scale 5.

The scale 4 is formed to have a hollow, substantially rectangular shape overall, and includes a fixated portion 4A, a first side surface portion 4B, a second side surface portion 4C, a first bottom surface portion 4D, a second bottom surface portion 4E, a top surface portion 4F, and a first groove 14. The fixated portion 4A is formed by an aluminum alloy extruded member, is located at an upper portion of the scale 4, and is fixated to the first measured portion W1. The first side surface portion 4B is located on a front surface side of the scale 4 and extends downward (−Z direction) from the fixated portion 4A. The second side surface portion 4C extends downward (−Z direction) from the fixated portion 4A to face the first measured portion W1 and is positioned on an opposite side of the scale 4 from the first side surface portion 4B. The first bottom surface portion 4D bends from a bottom end of the first side surface portion 4B and extends toward a back surface side of the scale 4 (in a +Y direction). The second bottom surface portion 4E bends from a bottom end of the second side surface portion 4C and extends toward the front surface side (in a −Y direction). The top surface portion 4F is located between the fixated portion 4A and the first side surface portion 4B. The first groove 14 is formed on the top surface portion 4F along the length direction (X direction) of the scale frame 4.

An open groove 4G opening along the length direction (X direction) is formed between the first bottom surface portion 4D and the second bottom surface portion 4E, and the detection device main body 6 and the detector 7 of the detection device 3 are connected through the open groove 4G. Also, a gap 16 is provided between the first bottom surface portion 4D and the detection device main body 6. The detection device main body 6 is formed to have a hollow, substantially rectangular shape overall, and includes a top surface portion 6A adjacent to the first bottom surface portion 4D and second bottom surface portion 4E of the scale frame 4; a bottom surface portion 6B located on a bottom surface; a front surface portion 6C located on a front surface; and a back surface portion 6D located on a back surface. The bottom surface portion 6B includes a second groove 15 formed so as to be parallel to the first groove 14 of the scale frame 4.

The detection device main body 6 includes an attachment hole 8 through which an attachment tool 200 is inserted (see FIG. 16, described below), which attaches and fixates the detection device 3 to the second measured portion W2. The attachment hole 8 is provided spanning from the front surface portion 6C to the back surface portion 6D of the detection device main body 6, and by inserting the attachment tool 200 from the front surface portion 6C toward the back surface portion 6D, the detection device 3 is attached and fixated to the second measured portion W2.

The measuring device 1 above uses the pair of holding members 20 to hold the detection device 3 on the scale frame 4. As shown in FIGS. 1A to 2, the pair of holding members 20 are configured by a first holding member 21, which is mounted to the measuring device 1 by displacing the first holding member 21 from a first side (−X direction side) toward the detection device 3; and a second holding member 22, which is mounted to the measuring device 1 by displacing the second holding member 22 from a second side (+X direction side) toward the detection device 3. The pair of holding members 20 are formed with a flexible material such as engineering plastic, for example.

The pair of holding members 20 hold the detection device 3 to the scale frame 4 and constrain displacement of the detection device 3 in order to prevent the detection device 3 moving in an arbitrary direction with respect to the measuring device main body 2 and making contact with the scale frame 4, or the like, and becoming damaged during a transport process up to a point of attachment with the measured portions W1 and W2, or the like. Moreover, when attaching the measuring device 1 to the measured portions W1 and W2, the pair of holding members 20 are used to position the detection device 3 with respect to the measuring device main body 2. Also, a locking tool 100 is used to fixate the pair of holding members 20 to the measuring device 1.

Figure 5A:
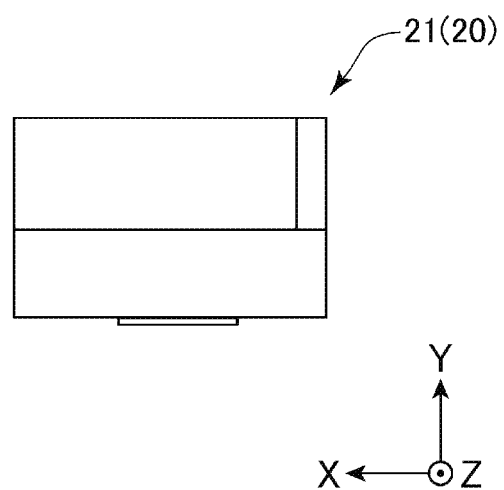
FIG. 5A is a plan view and FIG. 5B is a bottom view of the first holding member.
Figure 5B:
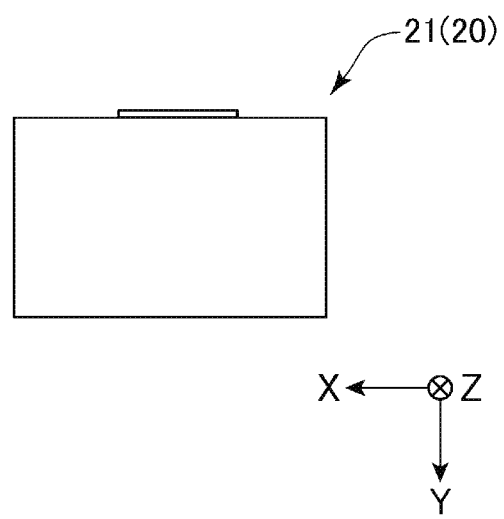
Figure 6:
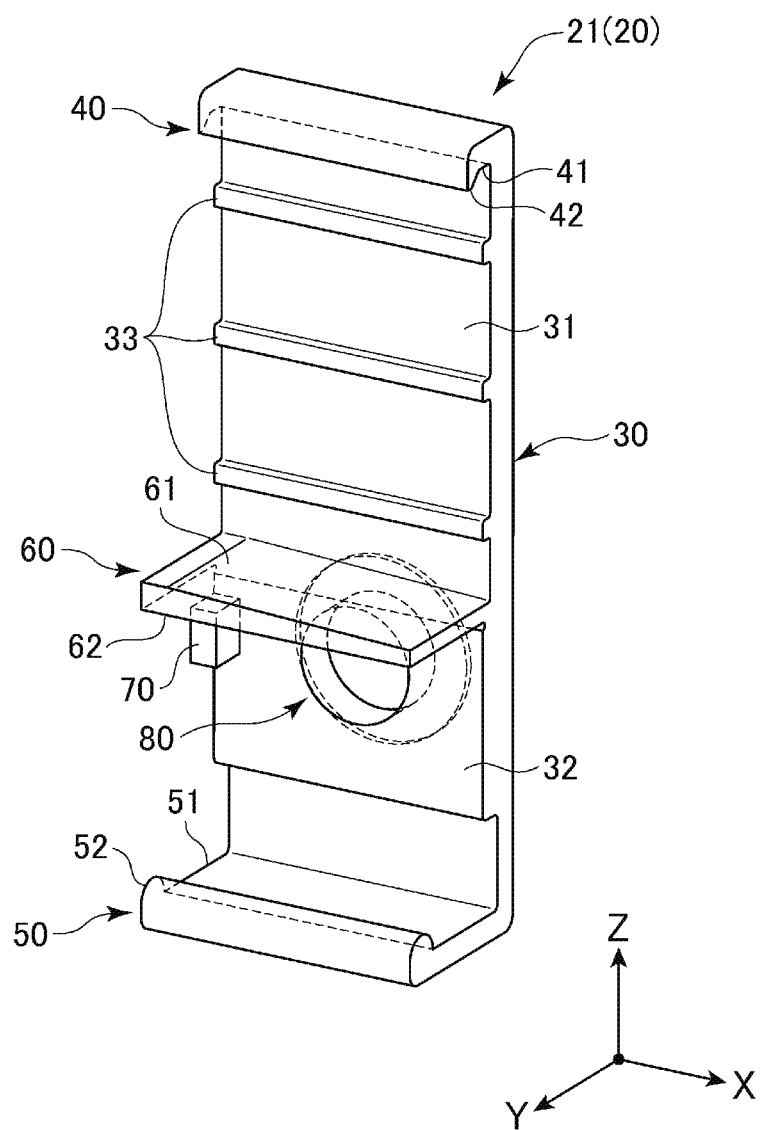
FIG. 6 is a perspective view of the first holding member.

A structure of the pair of holding members 20 is now described in detail. FIGS. 3A to 6 illustrate the first holding member of the pair of holding members. Specifically, FIGS. 3A to 5B are six planar views of the first holding member 21. FIG. 3A is a front view from the −Y direction and FIG. 3B is a back view from the +Y direction. FIG. 4A is a left side view from the +X direction and FIG. 4B is a right side view from the −X direction. FIG. 5A is a plan view from the +Z direction and FIG. 5B is a bottom view from the −Z direction. FIG. 6 is a perspective view of the first holding member 21. Specifically, FIG. 6 is a perspective view showing a back face of the first holding member 21 facing the measuring device 1.

Figure 9A:
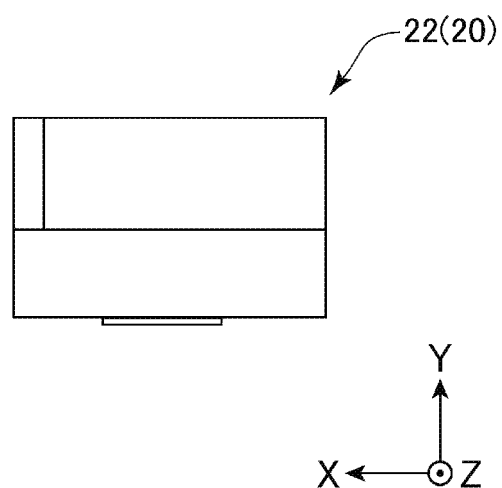
FIG. 9A is a plan view and FIG. 9B is a bottom view of the second holding member.
Figure 9B:
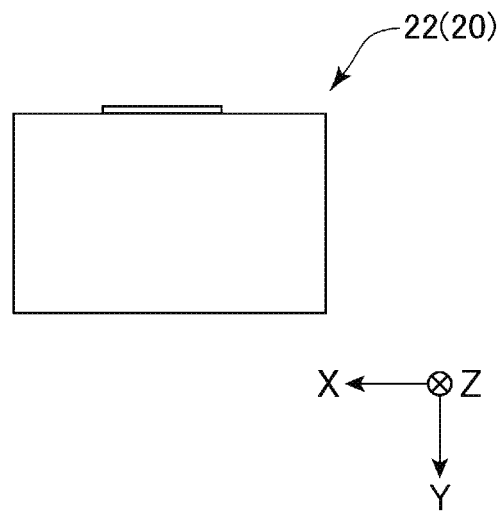

FIGS. 7A to 9B illustrate the second holding member of the pair of holding members. Specifically, FIGS. 7A to 9B are six planar views of the second holding member 22. FIG. 7A is a front view from the −Y direction and FIG. 7B is a back view from the +Y direction. FIG. 8A is a left side view from the +X direction and FIG. 8B is a right side view from the −X direction. FIG. 9A is a plan view from the +Z direction and FIG. 9B is a bottom view from the −Z direction. In this example, the first holding member 21 of FIGS. 3A to 6 and the second holding member 22 of FIGS. 7A to 9B are formed to be right/left symmetrical to each other, and are provided with similar configurations except that a shape of a projecting tab 60 and a position of a regulator 70 (described later) are right/left symmetrical. Therefore, the first holding member 21 is described as exemplary in the following, with reference to FIGS. 2 to 6.

As shown in FIGS. 2 to 6, the first holding member 21 is configured to include a plate-like (planar) main body 30 attached along a first side (−Y direction side) of the width direction of the scale frame 4; a first hook portion 40 engaging with the first groove 14; a second hook portion 50 engaging with the second groove 15; the projecting tab 60 projecting toward the gap 16; the regulator 70 regulating displacement of the first holding member 21; and an insertion hole 80 provided to the main body 30. The main body 30 includes a first backing portion 31 extending from the projecting tab 60 to the first hook portion 40, and a second backing portion 32 extending from the projecting tab 60 to the second hook portion 50. A projection 33 abutting the first side surface portion 4B of the scale frame 4 is provided to the first backing portion 31. In this example, by providing the projection 33 to the first backing portion 31, the projection 33 facilitates flexing of the first backing portion 31. The projection 33 may be provided at any desired location on the main body 30 and may have any desired shape, or the projection 33 may be omitted as inessential.

The first hook portion 40 is configured by a first extended portion 41 formed extending from the first backing portion 31 toward the first groove 14 on the top surface portion 4F of the scale frame 4; and a sharp-angled first tip portion 42 projecting from the first extended portion 41 toward the first groove 14. The second hook portion 50 is configured by a second extended portion 51 formed extending from the second backing portion 32 toward the second groove 15 on the bottom surface portion 6B of the detection device main body 6; and a curved second tip portion 52 projecting from the second extended portion 51 toward the second groove 15.

The projecting tab 60 includes a first abutting surface 61 abutting the first bottom surface portion 4D of the scale frame 4; and a second abutting surface 62 abutting the top surface portion 6A of the detection device main body 6. As shown in FIG. 3B, the first abutting surface 61 has a slope in a direction inclining away from the first bottom surface portion 4D of the scale frame 4 as the slope moves from a first side (−X direction side), where the regulator 70 is formed, toward a second side (+X direction side). In other words, the projecting tab 60 is formed such that a thickness between the first abutting surface 61 and the second abutting surface 62 becomes progressively thicker farther away from the detection device 3.

The regulator 70 is formed on the second backing portion 32, on an end portion on an opposite side from the detection device 3, and regulates displacement of the first holding member 21 at a predetermined holding position by abutting a side surface of the detection device 3. In other words, the regulator 70 controls a displacement amount of the projecting tab 60 (inserted into the gap 16) according to a position where the regulator 70 is provided, and also positions the insertion hole 80 of the first holding member 21 relative to the attachment hole 8. So long as the regulator 70 can abut the side surface of the detection device 3 and regulate the displacement of the first holding member 21 at the predetermined holding position, the regulator 70 can be provided at any desired position on the second backing portion 32.

The insertion hole 80 is formed on the second backing portion 32 and is formed to have a greater diameter than the attachment hole 8 of the detection device 3. In addition, the insertion hole 80 is formed to have a greater diameter than an attachment head 201 of the attachment tool 200 (see FIG. 16, described below), which attaches the detection device 3 to the second measured portion W2 (see FIGS. 1A and 1B); the attachment head 201 is inserted into the insertion hole 80; and the insertion hole 80 is formed to have a smaller diameter than a locking head 101 of the locking tool 100 (see FIG. 13). The locking head 101 is configured so as to abut the second backing portion 32.

Figure 10:
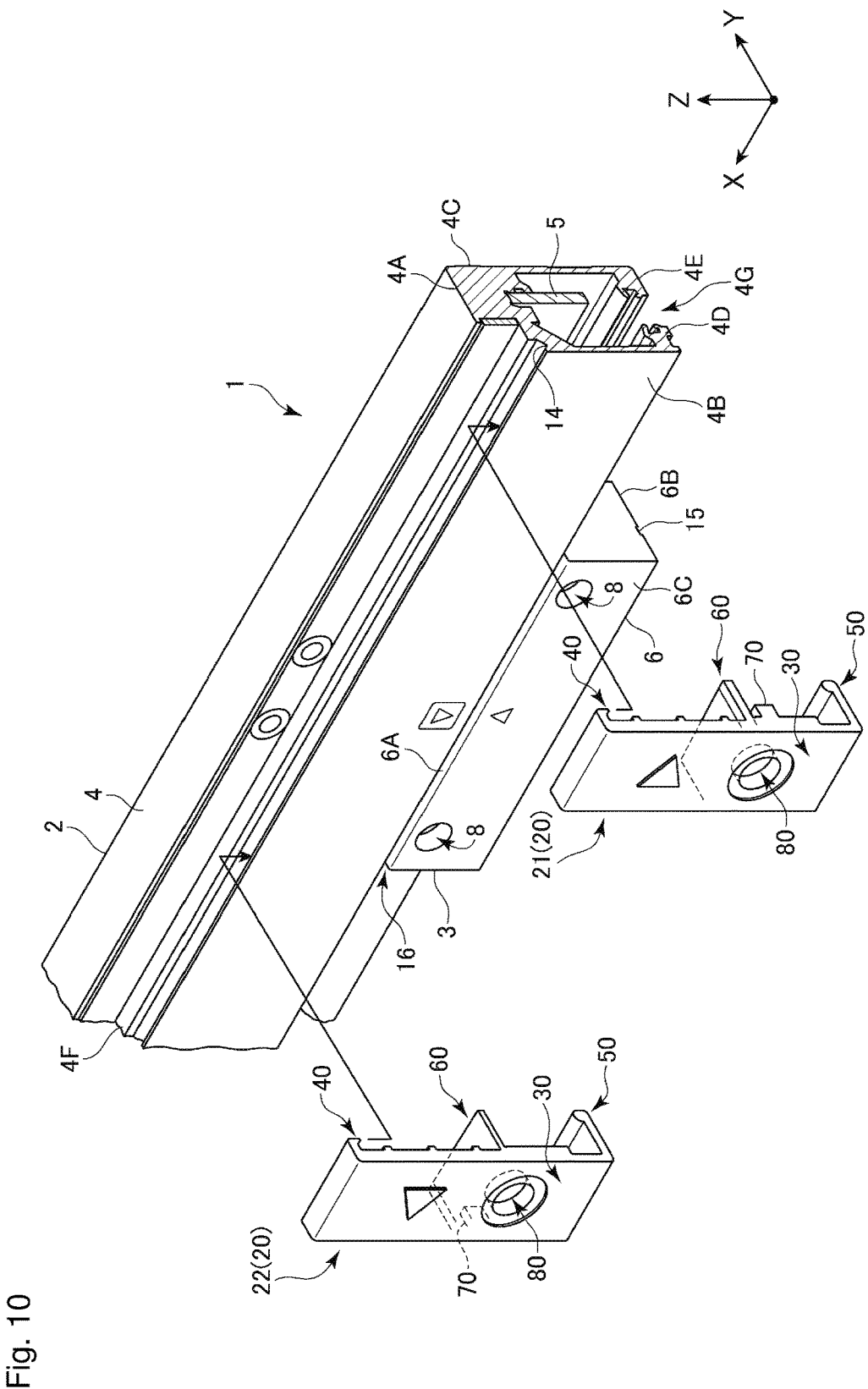
FIG. 10 is a perspective view illustrating a mechanism and procedure of attaching the pair of holding members.
Figure 11:
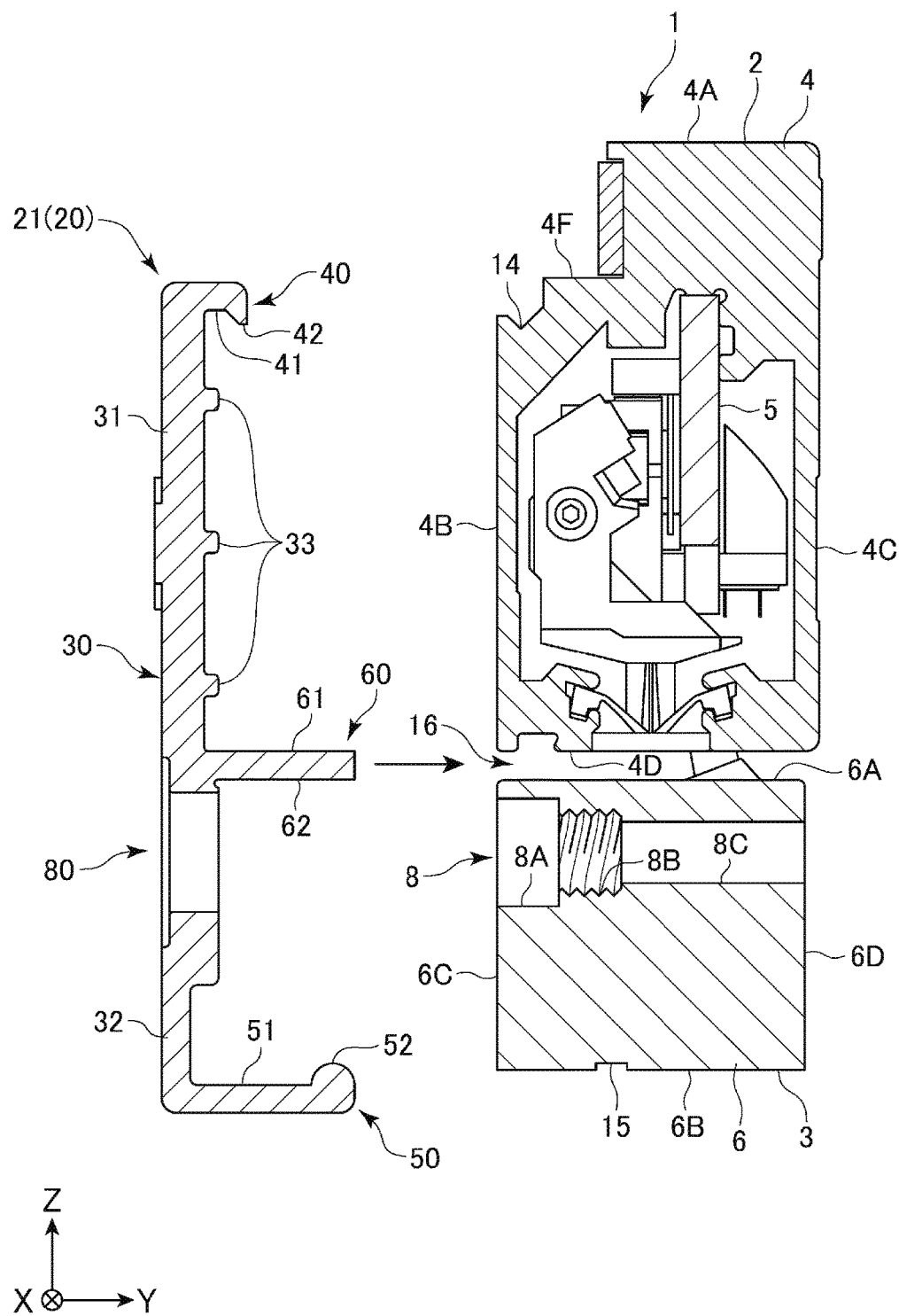
FIG. 11 is a cross-sectional view illustrating the mechanism and procedure of attaching the pair of holding members, subsequent to FIG. 10.
Figure 14:
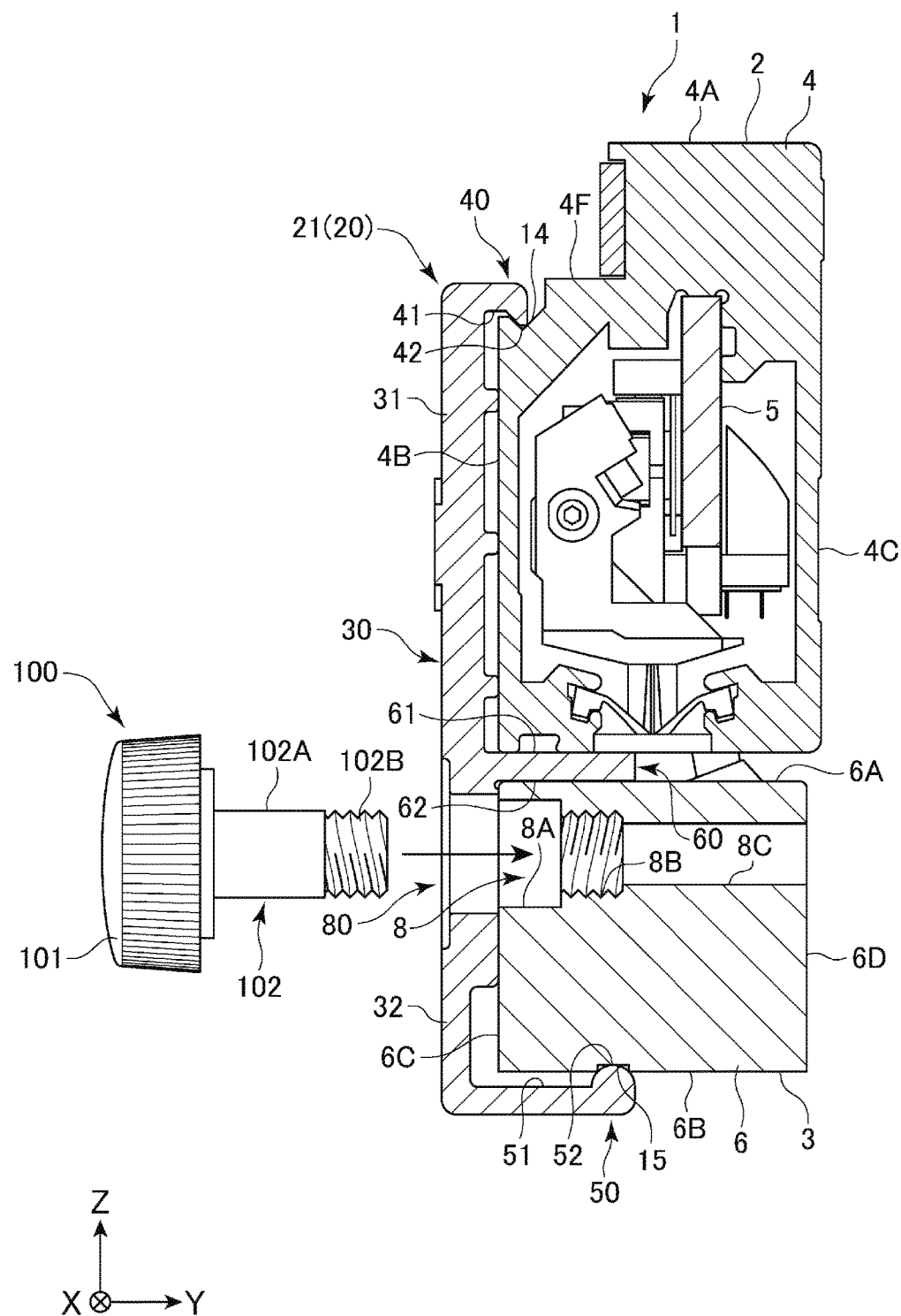
FIG. 14 is a cross-sectional view illustrating the mechanism and procedure of attaching the pair of holding members, subsequent to FIG. 13.
Figure 15:
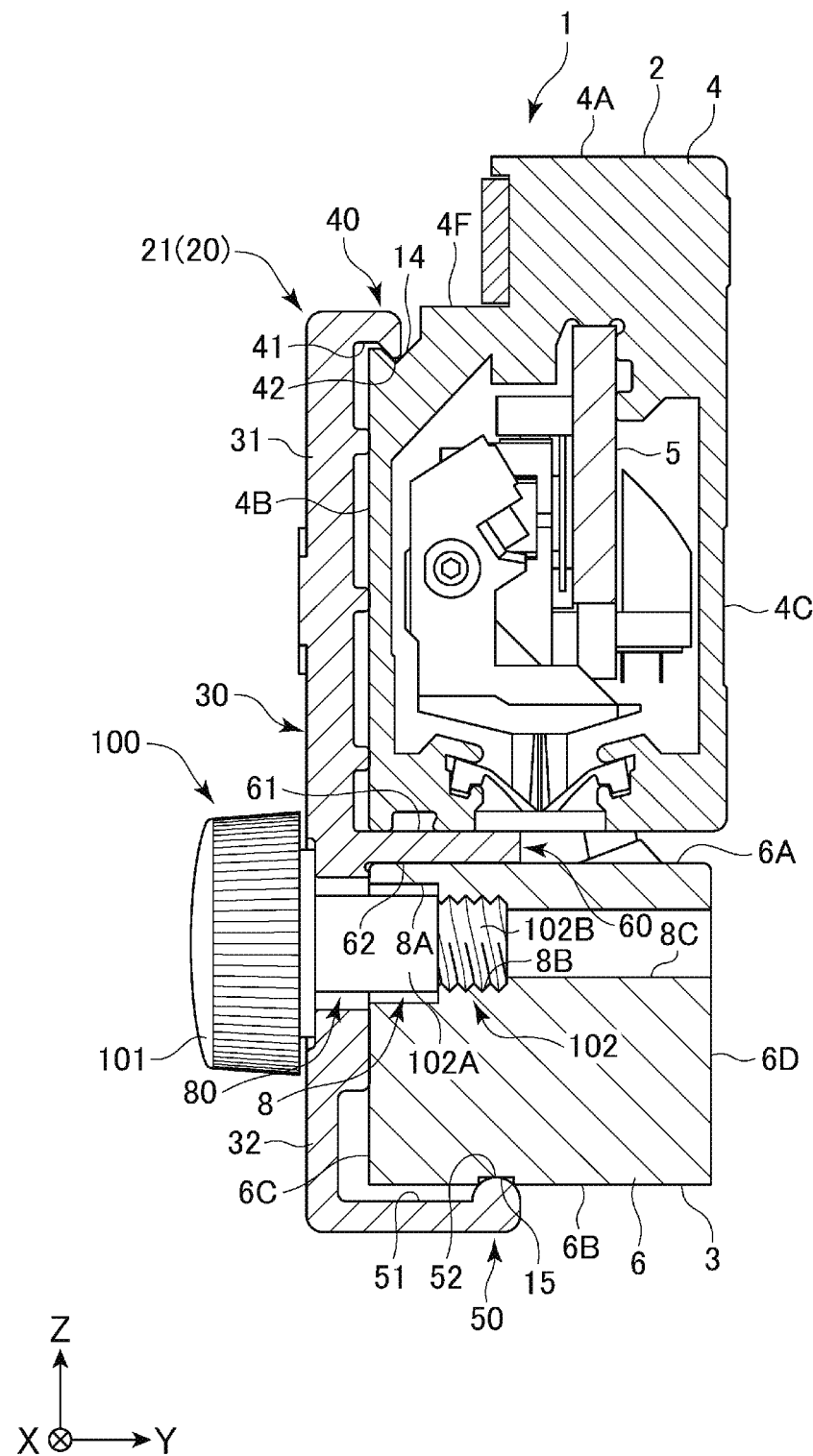
FIG. 15 is a cross-sectional view illustrating the mechanism and procedure of attaching the pair of holding members, subsequent to FIG. 14.

Next, a mechanism and procedure of attaching the pair of holding members 20 (the first holding member 21) to the measuring device 1 are described with reference to FIGS. 10 to 15. FIGS. 11, 14, and 15 are cross-sectional views along an A-A sectional plane of FIG. 1A. As shown in FIG. 10, in the procedure of attaching the first holding member 21, the detection device 3 is first displaced to a predetermined position along the length direction (X direction) of the scale frame 4. Next, the first holding member 21 locks the first hook portion 40 to the first groove 14 at a position in the −X direction and away from the detection device 3, and where the second hook portion 50 does not touch the detection device 3.

At this point, as shown in FIG. 11, when the first holding member 21 is displaced in the +X direction toward the detection device 3, the first hook portion 40 locks to the first groove 14 such that the projecting tab 60 is inserted into the gap 16. The first holding member 21 may also be mounted to the measuring device 1 by pressing the first holding member 21 from the −Y direction toward the +Y direction, onto the front face in the width direction (−Y direction side) of the detection device 3 and the scale frame 4, such that the projecting tab 60 is inserted into the gap 16. In this case, the first holding member 21 has flexibility, and therefore the first hook portion 40 and the second hook portion 50 bend and are engaged with the first groove 14 and the second groove 15, respectively.

Figure 12:
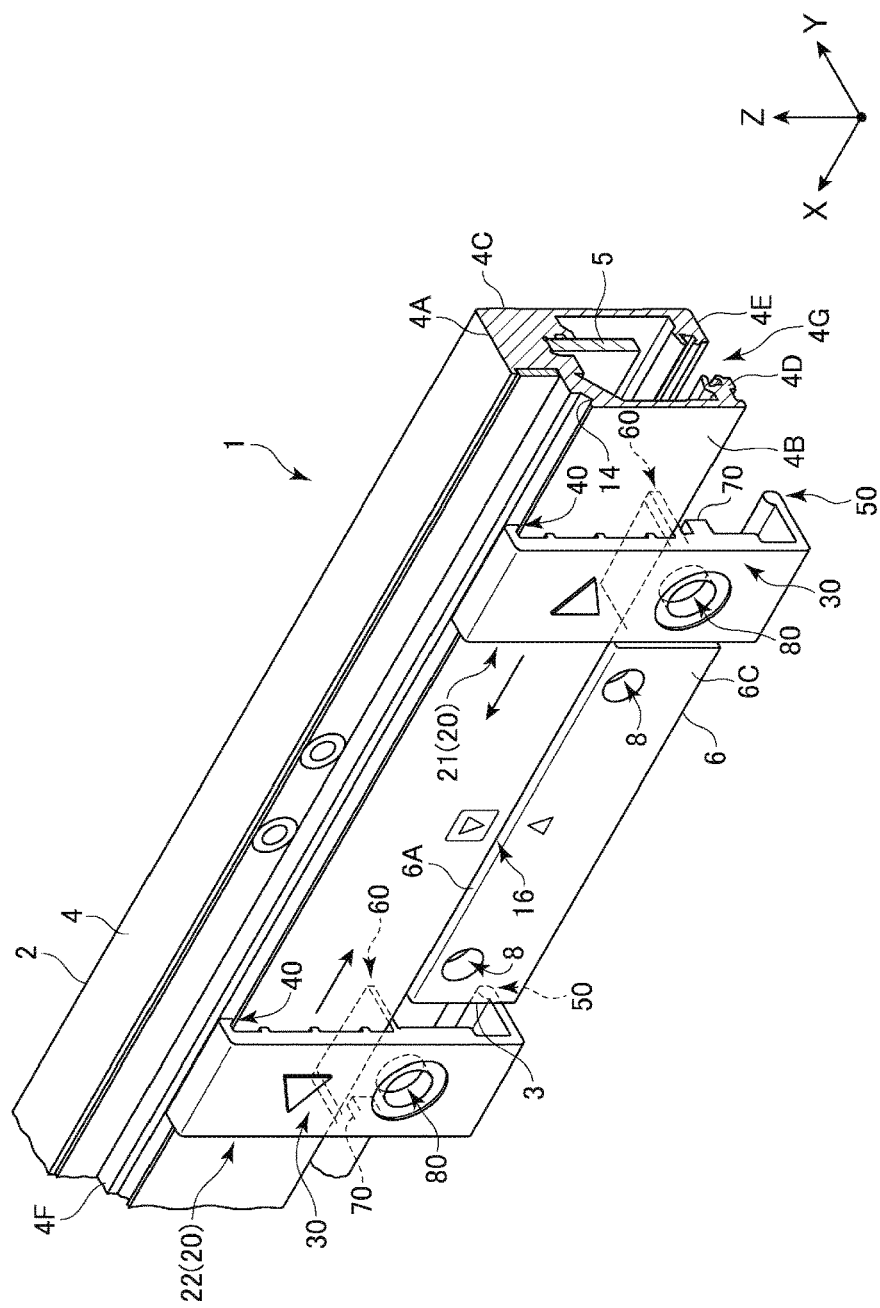
FIG. 12 is a perspective view illustrating the mechanism and procedure of attaching the pair of holding members, subsequent to FIG. 11.

Next, as shown in FIG. 12, the first holding member 21 is displaced in a direction toward the detection device 3 (+X direction) in a state where the first hook portion 40 remains engaged with the first groove 14, and the projecting tab 60 is inserted into the gap 16. By displacing the first holding member 21 in the direction toward the detection device 3, the projecting tab 60 slides against the first bottom surface portion 4D of the scale frame 4 and the top surface portion 6A of the detection device main body 6, and the detection device 3 and scale frame 4 are biased in mutually separating directions. The first holding member 21 is displaced until the regulator 70 abuts the first side surface (−X direction side) of the detection device 3.

Figure 13:
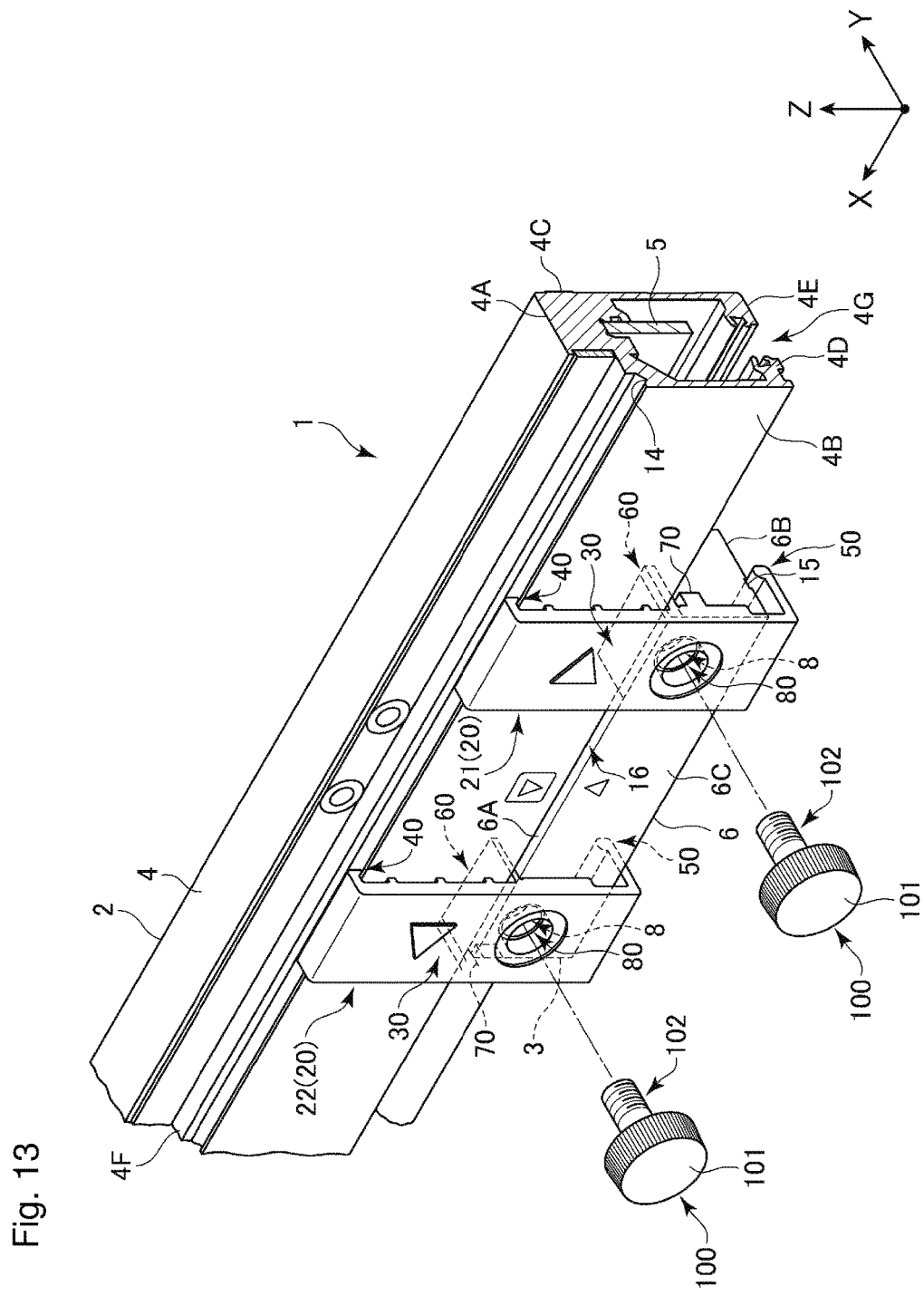
FIG. 13 is a perspective view illustrating the mechanism and procedure of attaching the pair of holding members, subsequent to FIG. 12.

Next, as shown in FIG. 13, after the regulator 70 of the first holding member 21 abuts the first side surface (−X direction side) of the detection device 3, the locking tool 100 engages in the attachment hole 8 via the insertion hole 80. In this example, as shown in FIG. 14, the attachment hole 8 is configured by a recess 8A, a first hole portion 8B, and a second hole portion 8C. The attachment hole 8 is formed running through the back surface portion 6D of the detection device main body 6, with threading cut into the first hole portion 8B so as to be capable of threading onto a second locking shaft 102B (described below), whereas threading is not cut into the second hole portion 8C.

In addition, the locking tool 100 is formed by the locking head 101, which has a greater diameter than the insertion hole 80; and the locking shaft 102, which projects from the locking head 101 and engages with the attachment hole 8 via the insertion hole 80. The locking shaft 102 is formed by a first locking shaft 102A, which is inserted into the recess 8A via the insertion hole 80; and a second locking shaft 102B onto which threading is cut. Accordingly, as shown in FIG. 15, by rotating the locking tool 100, the first hole portion 8B and the second locking shaft 102B are threaded together, and the first holding member 21 and the detection device 3 are secured, fixated to the measuring device 1. When the first locking shaft 102A and the second locking shaft 102B are inserted through the insertion hole 80 to fixate the first holding member 21, a state is created where the first holding member 21 and the detection device 3 are fixated without the locking tool 100 passing through the detection device 3. By performing a similar procedure with the second holding member 22, as well, the second holding member 22 and the detection device 3 can be secured, fixated to the measuring device 1, using the locking tool 100.

Figure 16:
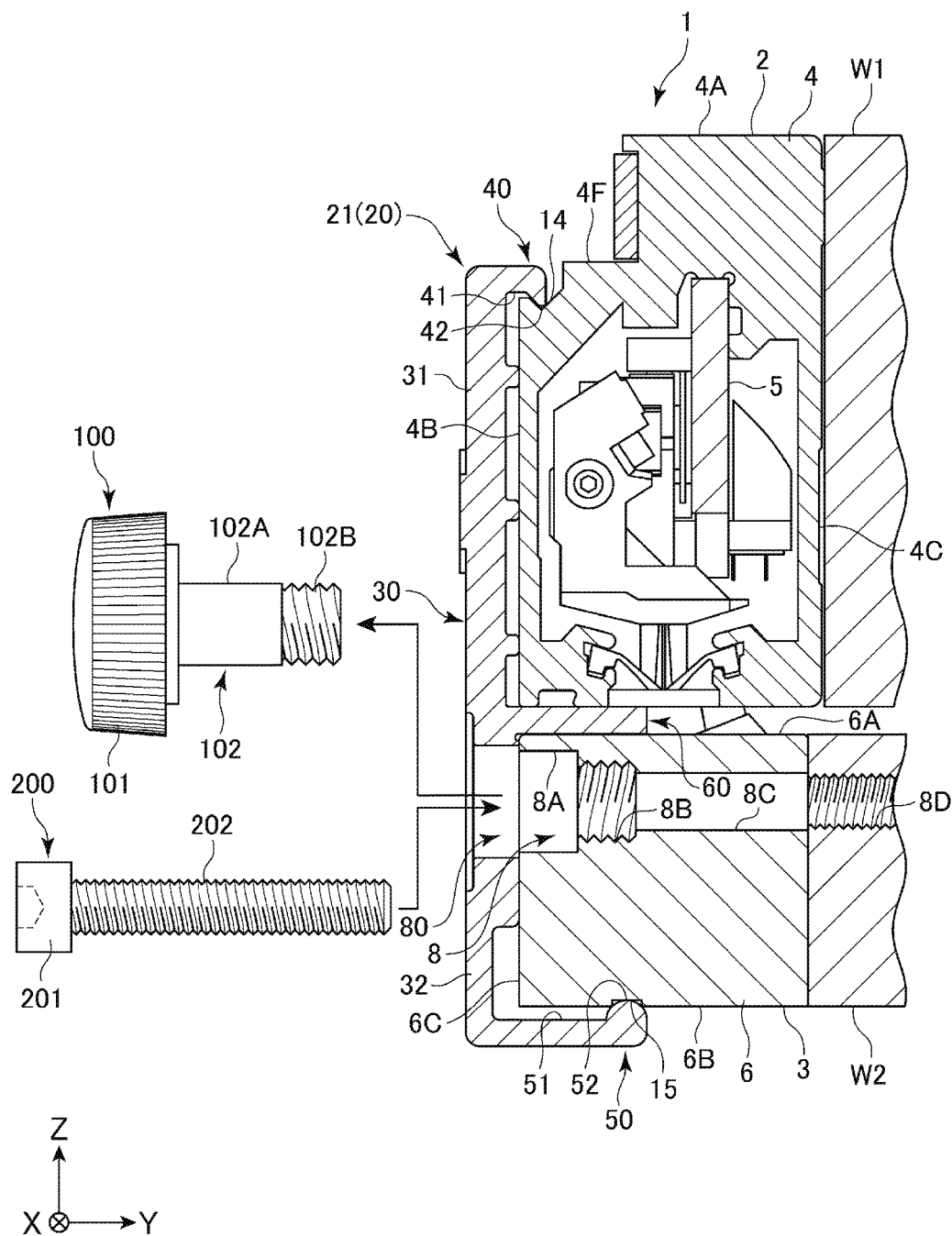
FIG. 16 is a cross-sectional view illustrating a mechanism and procedure of attaching a detection device to a second measured portion, using the pair of holding members.
Figure 17:
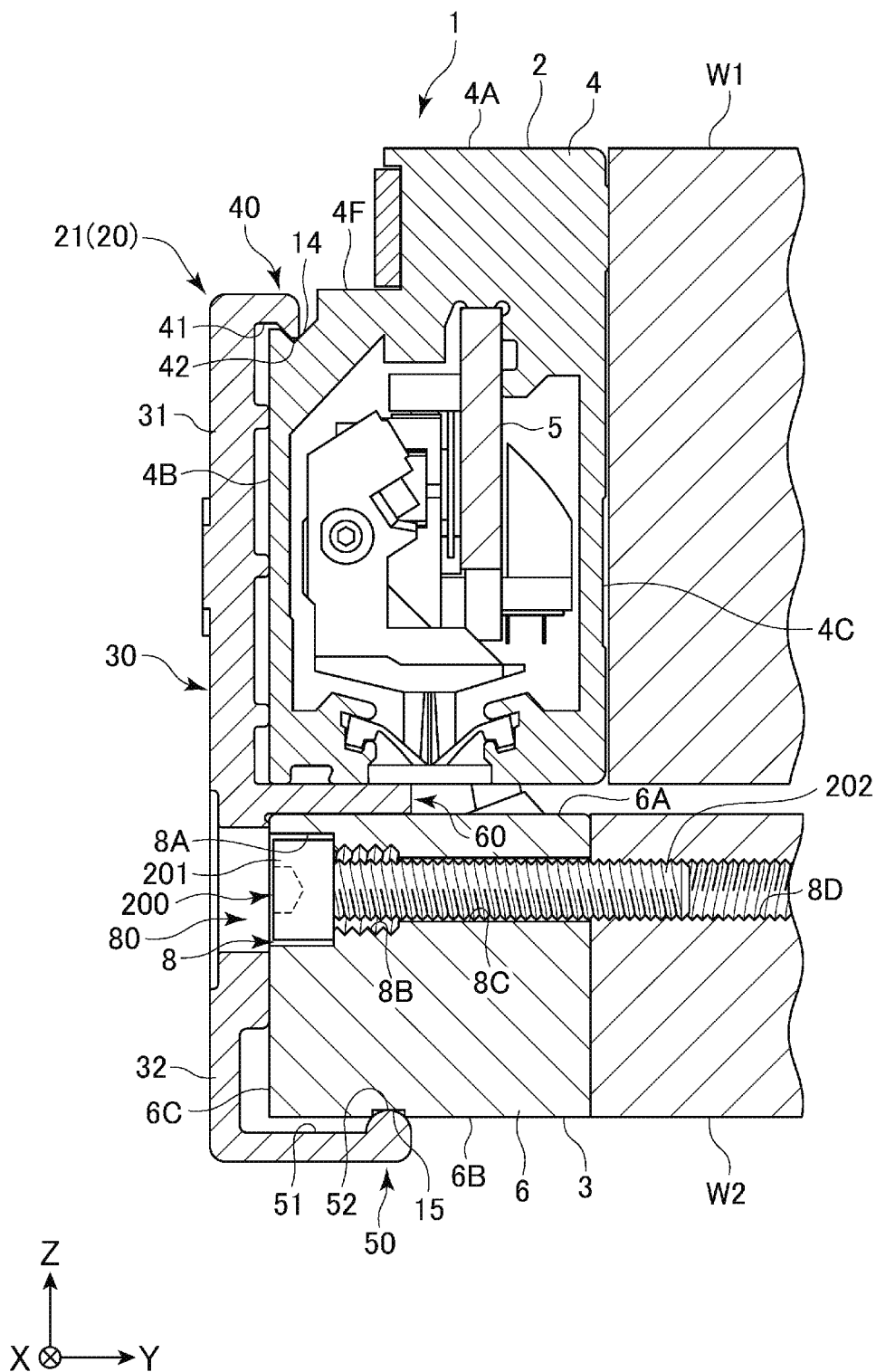
FIG. 17 is a cross-sectional view illustrating the mechanism and procedure of attaching the detection device to the second measured portion, subsequent to FIG. 16.
Figure 18:
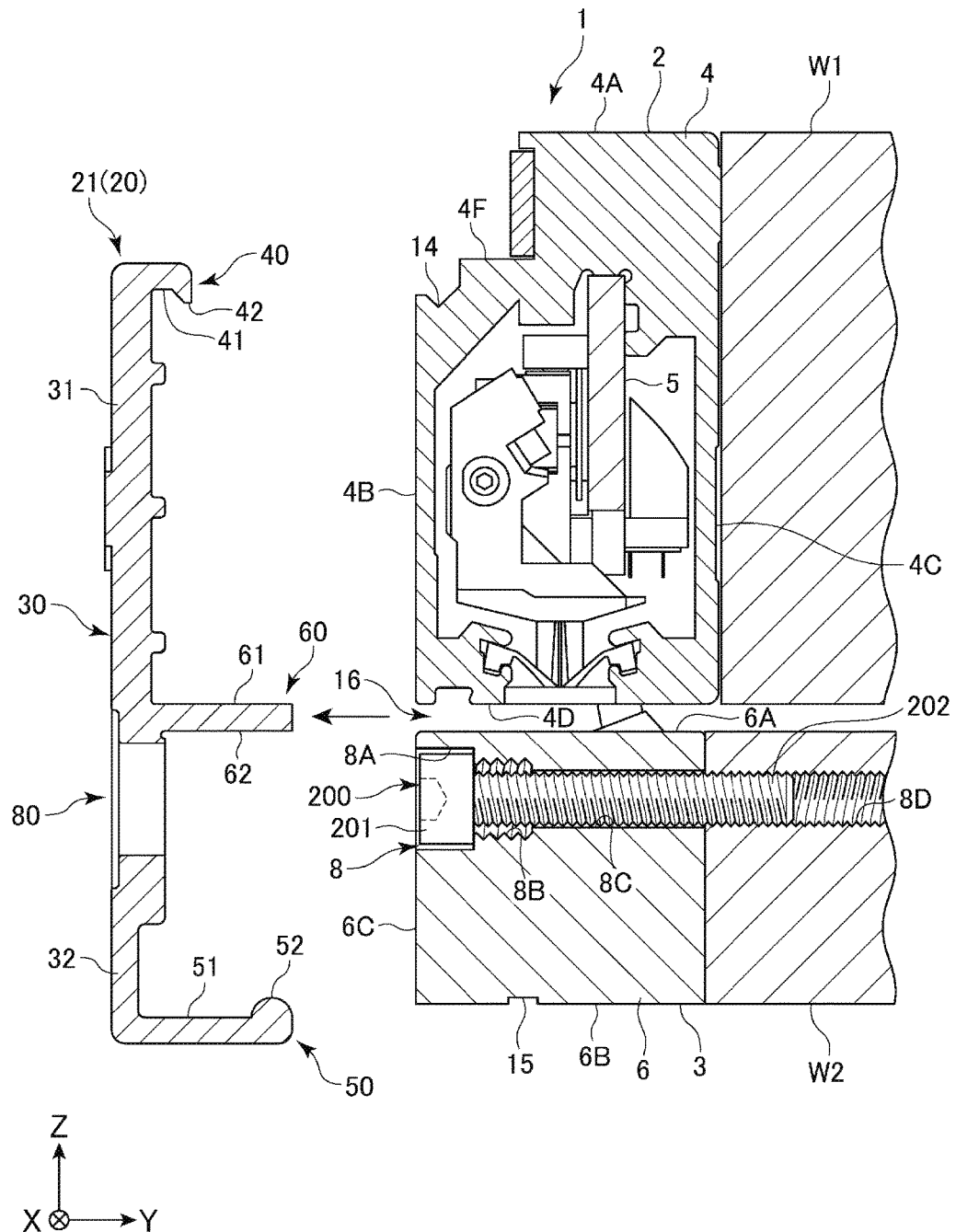
FIG. 18 is a cross-sectional view illustrating the mechanism and procedure of attaching the detection device to the second measured portion, subsequent to FIG. 17.

Next, a mechanism and procedure of attaching the detection device 3 to the second measured portion W2 is described with reference to FIGS. 16 to 18. FIGS. 16 to 18 are cross-sectional views along the A-A sectional plane of FIG. 1A. As shown in FIG. 16, a fixation hole 8D is formed on the second measured portion W2, the fixation hole 8D communicating with the second hole portion 8C of the attachment hole 8 in order to fixate the detection device 3. In this example, the attachment tool 200 is configured by the attachment head 201 and the attachment shaft 202, which is provided with threading from the attachment head 201 to an end portion and which threads together with the fixation hole 8D. In addition, the attachment hole 8 includes the recess 8A which is sunken to accommodate the attachment head 201 by threading together the fixation hole 8D and the attachment shaft 202. The attachment head 201 is formed to a greater diameter than that of the attachment shaft 202 and is formed to a size capable of being accommodated in the recess 8A.

An example of the procedure of attaching the detection device 3 to the second measured portion W2 is to first position the detection device 3 in a predetermined position along the length direction (X direction) of the scale frame 4 by displacing the detection device 3 while the pair of holding members 20 and the locking tool 100 are mounted thereto (see FIG. 2). In this example, because the pair of holding members 20 are mounted, displacement of the detection device 3 is regulated by friction between the first groove 14 and the first hook portion 40; friction between the second groove 15 and the second hook portion 50; and friction between the scale frame 4 and detection device 3 and the projecting tab 60. When positioning the detection device 3, the detection device 3 can be displaced along the length direction of the scale frame 4 by applying a force that exceeds the friction. Accordingly, by applying a force that exceeds the friction from the pair of holding members 20 in a state where the locking tool 100 is mounted, the detection device 3 is displaced and positioned at the predetermined position along the length direction (X direction) of the scale frame 4. Next, as shown in FIG. 16, the locking tool 100 is extracted from the first holding member 21. Then, the attachment tool 200 is inserted through the insertion hole 80 and the attachment hole 8, through which the locking tool 100 had been inserted prior to extraction.

Next, as shown in FIG. 17, the attachment tool 200 fixates the detection device 3 to the second measured portion W2. The first hole portion 8B is formed with a diameter greater than that of the attachment shaft 202, and therefore when the attachment tool 200 is inserted into the attachment hole 8, the attachment shaft 202 passes through to the fixation hole 8D without threading onto the first hole portion 8B and the second hole portion 8C. The attachment shaft 202 passes through the detection device 3 and fixates the second measured portion W2 and the detection device 3 by threading together with the fixation hole 8D. Then, by threading together the attachment shaft 202 and the fixation hole 8D, the attachment head 201 is accommodated in the recess 8A of the attachment hole 8. Therefore, as shown in FIG. 18, after the detection device 3 is fixated to the second measured portion W2 with the attachment tool 200, by displacing the first holding member 21 in the −X direction, the first holding member 21 can be separated from the measuring device 1 in a simple action. The detection device 3 can be fixated to the second measured portion W2 using the attachment tool 200 by performing a similar procedure with the second holding member 22, as well.

In this way, the following effects and advantages can be achieved according to the present embodiment:

(1) The pair of holding members 20 include the first hook portion 40 engaging with the first groove 14; the second hook portion 50 engaging with the second groove 15; and the projecting tab 60 biasing the scale frame 4 and the detection device 3 in mutually separating directions by inserting the projecting tab 60 into the gap 16, and the pair of holding members 20 displace from the first and second sides of the length direction of the scale frame 4 (X direction) toward the detection device 3, enabling the pair of holding members 20 to be mounted on the measuring device 1. Accordingly, the pair of holding members 20 can be mounted without performing work from below the measuring device 1, and therefore ease of an attachment task can be improved.

(2) The pair of holding members 20 engage the first hook portion 40 on the first groove 14 and engage the second hook portion 50 on the second groove 15, and also displace the respective projecting tabs 60 toward the detection device 3 along the length direction of the scale frame 4 (X direction) and insert the respective projecting tabs 60 into the gap 16, enabling the detection device 3 to be held from two sides. At this point, the projecting tab 60 makes sliding contact with the scale frame 4 and the detection device 3, and the scale frame 4 and detection device 3 are biased in mutually separating directions, enabling contact between the scale frame 4 and the detection device 3 to be prevented. Accordingly, the pair of holding members 20 can prevent the scale 5 or sensors (the detector 7) of the detection device 3 from being damaged by contact which may occur between the scale frame 4 and the detection device 3 due to shaking or the like during transport.

(3) The pair of holding members 20 are configured by the first hook portion 40, the second hook portion 50, and the projecting tab 60, which each have a simple shape. Therefore, the structure of the pair of holding members 20 can be simplified.

(4) Displacement of the pair of holding members 20 is regulated by friction between the first groove 14 and the first hook portion 40; friction between the second groove 15 and the second hook portion 50; and friction between the scale frame 4 and detection device 3 and the projecting tab 60. Therefore, when positioning the detection device 3, the detection device 3 can be displaced along the length direction of the scale frame 4 (X direction) by applying a force that exceeds the friction. Accordingly, by using the pair of holding members 20, an operator can readily position the detection device 3.

(5) The projecting tab 60 is formed so as to become progressively thicker farther away from the detection device 3. Therefore, simply by displacing the pair of holding members 20 from the first and second sides along the length direction of the scale frame 4 (X direction) toward the detection device 3, the scale frame 4 and the detection device 3 can be readily biased in mutually separating directions.

(6) By inserting the locking tool 100 through the insertion hole 80 and into the attachment hole 8, the detection device 3 and the pair of holding members 20 can be fixated to each other. Accordingly, the locking tool 100 can prevent the pair of holding members 20 from separating from the measuring device 1 and can favorably maintain a retention status of the detection device 3.

(7) The locking tool 100 fixates the pair of holding members 20 using the attachment hole 8, which is provided to the detection device 3. Accordingly, there is no need to provide a screw hole or the like simply to fixate the pair of holding members 20 to the measuring device 1, and therefore costs can be reduced.

(8) The insertion hole 80 is formed to have a diameter greater than that of the attachment head 201 of the attachment tool 200 and also to have a diameter smaller than that of the locking head 101 of the locking tool 100, and the locking tool 100 includes the locking head 101 having the diameter greater than that of the insertion hole 80. Therefore, by removing the locking tool 100 after determining an attachment position of the detection device 3, the operator can attach the detection device 3 to the second measured portion W2 using the attachment tool 200 while the pair of holding members 20 remain mounted. In other words, simply by swapping the locking tool 100 for the attachment tool 200 when moving from the task of positioning the detection device 3 to the task of attaching the detection device 3, various tasks can be performed while the pair of holding members 20 remain mounted and workability can be improved.

(9) By providing the recess 8A to the attachment hole 8, the attachment head 201 can be sunk into and accommodated in a surface where the pair of holding members 20 are attached, without the attachment head 201 protruding. Therefore, after the detection device 3 is attached to the second measured portion W2 while the pair of holding members 20 remain mounted, simply by displacing the holding members 20 in the opposite direction from the direction in which the holding members 20 were displaced when mounted on the measuring device 1, the holding members 20 can be readily removed from the measuring device 1.

(10) The regulator 70 abuts the detection device 3 and regulates displacement of the pair of holding members 20, and therefore can prevent excessive displacement of the pair of holding members 20. In addition, the regulator 70 enables accurate displacement of the pair of holding members 20 to the predetermined holding position and also enables adequate retention of the detection device 3.

Modifications

Moreover, the present invention is not limited to the above-described embodiment, and includes modifications and improvements within a scope capable of achieving the advantages of the present invention. For example, in the embodiment described above, a case is described using a holding mechanism on the optical measuring device 1 (linear scale). However, any device having a detection device that is displaceably provided to a measuring device main body is suitable as the measuring device, and a format, detection method, and the like of the detection device are not particularly limited.

In the embodiment described above, the scale frame 4 of the measuring device main body 2 is formed in a hollow, substantially rectangular shape overall. However, the shape of the scale frame 4 is not limited to a rectangle and may be any desired shape. In the embodiment above, the first groove 14 is formed in the top surface portion 4F of the scale frame 4 and the second groove 15 is formed in the bottom surface portion 6B of the detection device main body 6. However, the first groove 14 may instead be formed in the fixated portion 4A or the first side surface portion 4B of the scale frame 4, and the second groove 15 may instead be formed in the front surface portion 6C of the detection device main body 6. In other words, so long as the first hook portion 40 can engage with the first groove 14 and the second hook portion 50 can engage with the second groove 15 to hold the scale frame 4 and the detection device 3, the first groove 14 and the second groove 15 may be formed on any surface.

In the embodiment described above, the first tip portion 42 of the first hook portion 40 is formed in a sharp-angled shape, and the second tip portion 52 of the second hook portion 50 is formed in a curved shape. However, so long as the tip portions have a shape capable of engaging with the first groove 14 and the second groove 15, respectively, the tip portions may be any shape. Also, the first hook portion 40 is formed facing down (−Z direction) and the second hook portion 50 is formed facing up (+Z direction). However, so long as the hook portions are able to engage with the first groove 14 and the second groove 15, respectively, the hook portions may be formed facing in any desired direction.

In the embodiment above, the pair of holding members 20 are mounted to the surface on the opposite side from the fixated portion 4A, which is fixated to the first measured portion W1. However, the pair of holding members 20 may instead be mounted to a surface on the fixated portion 4A side. Also, the pair of holding members 20 are flexible, but the pair of holding members 20 may lack flexibility instead. In the embodiment described above, the first holding member 21 and the second holding member 22 are formed with right/left symmetry. However, the first holding member 21 and the second holding member 22 may also be formed without right/left symmetry and may also be formed to differ from each other. In other words, so long as the detection device 3 can be held to the scale frame 4 by the first holding member 21 and the second holding member 22, the first holding member 21 and the second holding member 22 may be formed in any shape.

In the embodiment above, the slope is provided to the first abutting surface 61 of the projecting tab 60. A slope may instead be provided to the second abutting surface 62 of the projecting tab 60, or a slope may be provided to the first abutting surface 61 and the second abutting surface 62. Also, the first abutting surface 61 and the second abutting surface 62 may be provided with no slope by forming the first abutting surface 61 and the second abutting surface 62 to be parallel and thicker than the gap 16. Moreover, rather than being flat surfaces, the first abutting surface 61 and the second abutting surface 62 may be provided with surface unevenness, or may be formed with undulations. In other words, the projecting tab 60 should be formed such that the thickness of the projecting tab 60 inserted into the gap 16 between the scale frame 4 and the detection device main body 6 increases, and so long as the scale frame 4 and the detection device 3 can be fixated, the projecting tab 60 may have any shape. Also, the pair of holding members 20 are provided with the insertion hole 80 on the main body 30, but the insertion hole 80 may also not be provided. Furthermore, the regulator 70 may have any desired shape, or may be omitted.

In the embodiment described above, the insertion hole 80 of the pair of holding members 20 is formed to have a diameter greater than that of the attachment hole 8 of the detection device 3. However, the insertion hole 80 may also be formed to have the same diameter as the attachment hole 8. In other words, the detection device 3 and the second measured portion W2 should be able to be fixated together by the attachment tool 200 in a state where the pair of holding members 20 are mounted to the measuring device 1, and therefore the insertion hole 80 should be formed to a diameter enabling the attachment tool 200 to be inserted. Also, the recess 8A of the attachment hole 8 is formed so as to be capable of accommodating the attachment head 201, the first hole portion 8B is cut with threading which threads together with the second locking shaft 102B of the locking tool 100, and the second hole portion 8C is formed without threading. However, threading may be cut into all of the recess 8A, the first hole portion 8B, and the second hole portion 8C, or threading may be cut into none of these. Also, the recess 8A may be omitted. In other words, so long as the pair of holding members 20 and the measuring device 1 can be fixated to each other using the locking tool 100 and the detection device 3 can be fixated to the second measured portion W2 using the attachment tool 200, an interior of the attachment hole 8 may be formed in any way.

The embodiment described above uses the locking tool 100 having threading. However, the locking tool 100 may instead perform fixation by pressing in resin or the like, for example. In other words, the locking tool 100 should be capable of insertion through the insertion hole 80 and into the attachment hole 8, and of fixating the detection device 3 to the pair of holding members 20, and any means may be used to accomplish this. Also, the insertion hole 80 of the pair of holding members 20 is formed to have a diameter greater than that of the recess 8A of the attachment hole 8 and is formed in a circular shape. However, so long as the insertion hole 80 is formed to have a diameter greater than that of the attachment head 201 of the attachment tool 200 and to have a diameter smaller than that of the locking head 101 of the locking tool 100, the insertion hole 80 may be formed in any desired shape.

As noted above, with a measuring device including a scale frame housing a scale and a detection device detecting an amount of relative displacement with respect to the scale, the present invention can be favorably used in a holding mechanism holding the detection device of the measuring device to the scale frame.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A holding mechanism for use in a measuring device that includes a long scale frame fixed to a first measurable section and housing a scale, and a detector fixed to a second measurable section and provided so as to be capable of displacement in a length direction of the scale frame, the detector configured to detect an amount of relative displacement relative to the scale, the holding mechanism comprising:
   a first groove formed in the scale frame along the length direction of the scale frame;
   a second groove formed in the detector so as to be parallel to the first groove; and
   a pair of holders configured to hold the detector by being attached to first and second sides of the scale frame in the length direction, wherein:
   each holder of the pair of holders comprises:
      a planar section attached along a side surface of the scale frame and the detector;
      a first hook projecting from the planar section and engaging the first groove;
      a second hook projecting from the planar section and engaging the second groove; and
      a projecting tab projecting from the planar section and positioned at a gap between the scale frame and the detector,
   the pair of holders are displaceable from the first and second sides toward the detector along the length direction of the scale frame, and
   each projecting tab is insertable into a gap between the scale frame and the detector, such that each projecting tab biases the scale frame and the detector in mutually separating directions.

2. The holding mechanism according to claim 1, wherein a thickness of each projecting tab is progressively thicker farther away from the detector.

3. The holding mechanism according to claim 1, wherein:
   the detector is attachable to the second measurable section by an attachment tool and includes an attachment hole with which the attachment tool engages, and
   each holder of includes an insertion hole formed on the planar section and through which the attachment tool is inserted, and each holder is fixed to the detector by a locking tool inserted through the insertion hole and into the attachment hole.

4. The holding mechanism according to claim 2, wherein:
   the detector is attachable to the second measurable section by an attachment tool and includes an attachment hole with which the attachment tool engages, and
   each holder of includes an insertion hole formed on the planar section and through which the attachment tool is inserted, and each holder is fixed to the detector by a locking tool inserted through the insertion hole and into the attachment hole.

5. The holding mechanism according to claim 3, wherein the attachment tool comprises:
   an attachment shaft engaging with the second measurable section; and
   an attachment head having a diameter greater than that of the attachment shaft,
   the second measurable section comprises:
      a fixation hole engaging with the attachment shaft,
   the locking tool comprises:
      a locking shaft locking with the insertion hole and the attachment hole; and
      a locking head having a diameter greater than that of the insertion hole,
   and wherein the insertion hole is formed to have a greater diameter than that of the attachment head, the attachment head is inserted through the insertion hole, and the insertion hole is formed to have a smaller diameter than that of the locking head.

6. The holding mechanism according to claim 4, wherein the attachment tool comprises:
   an attachment shaft engaging with the second measurable section; and
   an attachment head having a diameter greater than that of the attachment shaft,
   the second measurable section comprises:
      a fixation hole engaging with the attachment shaft,
   the locking tool comprises:
      a locking shaft locking with the insertion hole and the attachment hole; and
      a locking head having a diameter greater than that of the insertion hole,
   and wherein the insertion hole is formed to have a greater diameter than that of the attachment head, the attachment head is inserted through the insertion hole, and the insertion hole is formed to have a smaller diameter than that of the locking head.

7. The holding mechanism according to claim 3, wherein the attachment hole includes a recess which is sunken into the detector to accommodate the attachment head by engaging the fixation hole and the attachment shaft.

8. The holding mechanism according to claim 4, wherein the attachment hole includes a recess which is sunken into the detector to accommodate the attachment head by engaging the fixation hole and the attachment shaft.

9. The holding mechanism according to claim 5, wherein the attachment hole includes a recess which is sunken into the detector to accommodate the attachment head by engaging the fixation hole and the attachment shaft.

10. The holding mechanism according to claim 6, wherein the attachment hole includes a recess which is sunken into the detector to accommodate the attachment head by engaging the fixation hole and the attachment shaft.

11. The holding mechanism according to claim 1, wherein each holder further comprises a regulator on an end on an opposite side from the detector, the regulator configured to regulate displacement of the pair of holders by abutting the side surface of the detector.

12. The holding mechanism according to claim 2, wherein the pair of holders further comprise a regulator on an end on an opposite side from the detector, the regulator configured to regulate displacement of the pair of holders by abutting the side surface of the detector.

13. The holding mechanism according to claim 3, wherein the pair of holders further comprise a regulator on an end on an opposite side from the detector, the regulator configured to regulate displacement of the pair of holders by abutting the side surface of the detector.

14. The holding mechanism according to claim 4, wherein the pair of holders further comprise a regulator on an end on an opposite side from the detector, the regulator configured to regulate displacement of the pair of holders by abutting the side surface of the detector.

15. The holding mechanism according to claim 5, wherein the pair of holders further comprise a regulator on an end on an opposite side from the detector, the regulator configured to regulate displacement of the pair of holders by abutting the side surface of the detector.

16. The holding mechanism according to claim 6, wherein the pair of holders further comprise a regulator on an end on an opposite side from the detector, the regulator configured to regulate displacement of the pair of holders by abutting the side surface of the detector.

17. The holding mechanism according to claim 7, wherein the pair of holders further comprise a regulator on an end on an opposite side from the detector, the regulator configured to regulate displacement of the pair of holders by abutting the side surface of the detector.

18. The holding mechanism according to claim 8, wherein the pair of holders further comprise a regulator on an end on an opposite side from the detector, the regulator configured to regulate displacement of the pair of holders by abutting the side surface of the detector.

19. The holding mechanism according to claim 9, wherein the pair of holders further comprise a regulator on an end on an opposite side from the detector, the regulator configured to regulate displacement of the pair of holders by abutting the side surface of the detector.

20. The holding mechanism according to claim 10, wherein the pair of holders further comprise a regulator on an end on an opposite side from the detector, the regulator configured to regulate displacement of the pair of holders by abutting the side surface of the detector.

* * * * *